Oct. 25, 1966 P. K. CHURCH ETAL 3,281,808
DATA MEASURING AND TRANSMISSION SYSTEM
Filed April 27, 1962 3 Sheets-Sheet 1
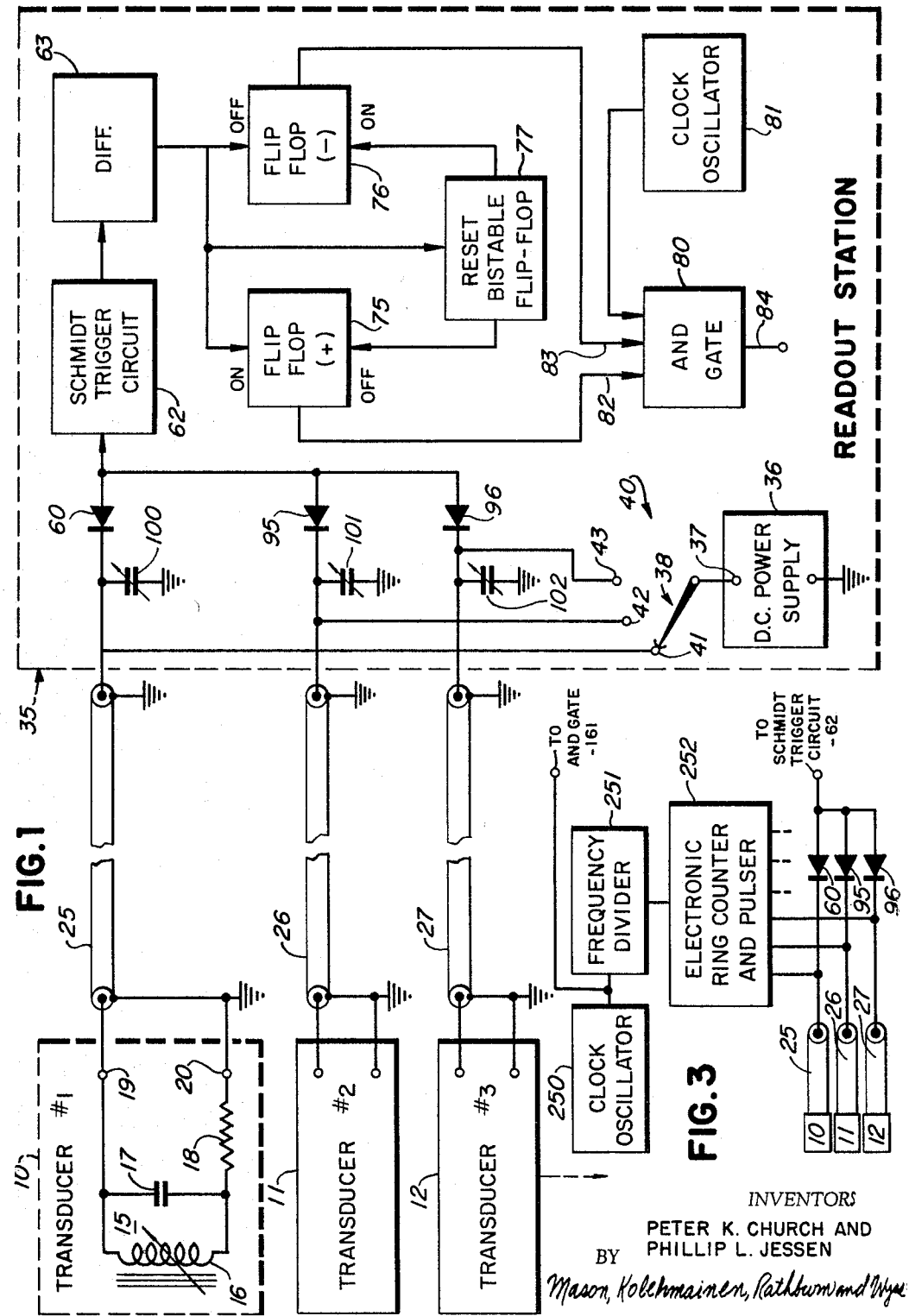
INVENTORS
PETER K. CHURCH AND
PHILLIP L. JESSEN
BY Mason, Kolehmainen, Rathburn and Wyss
ATTORNEYS

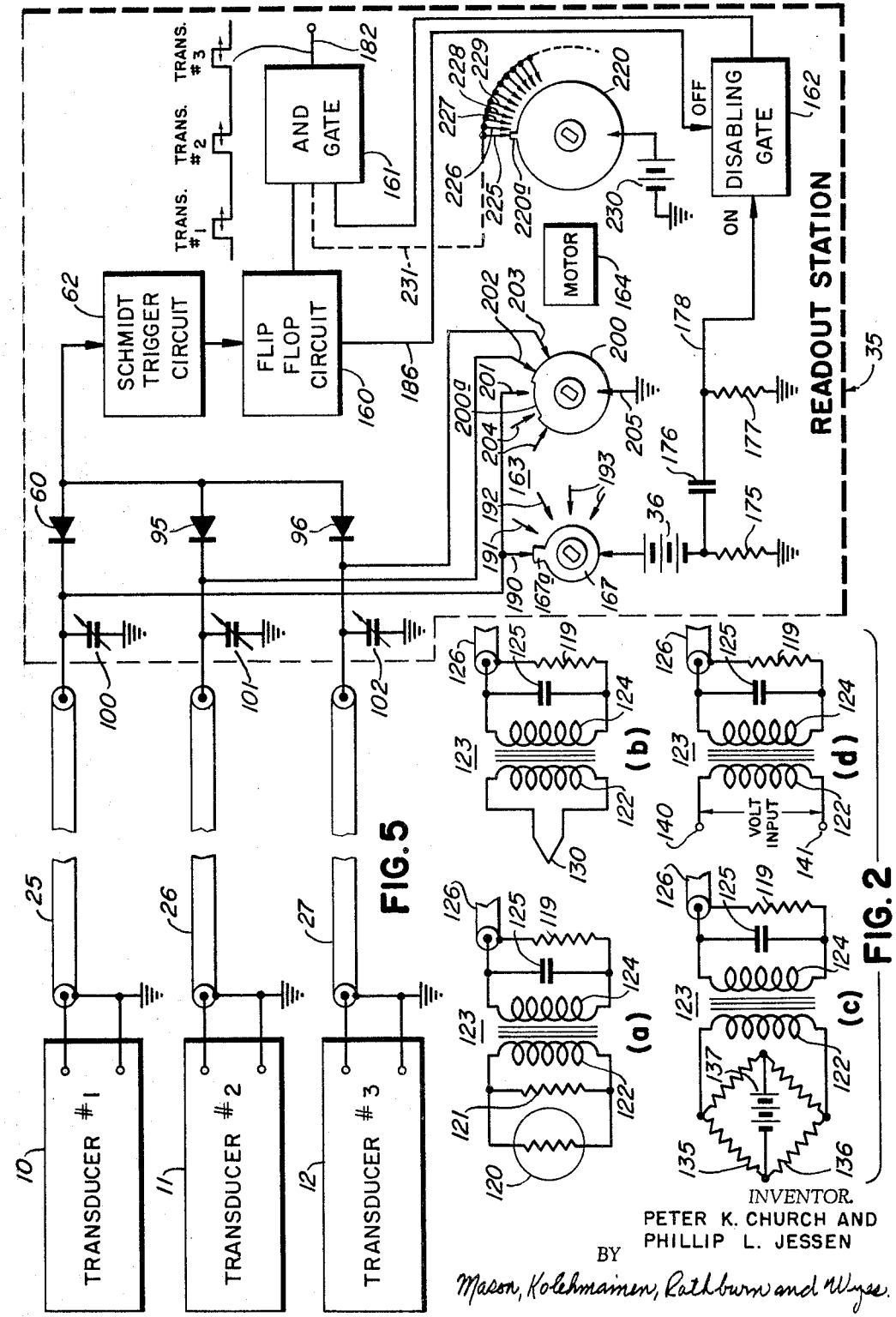

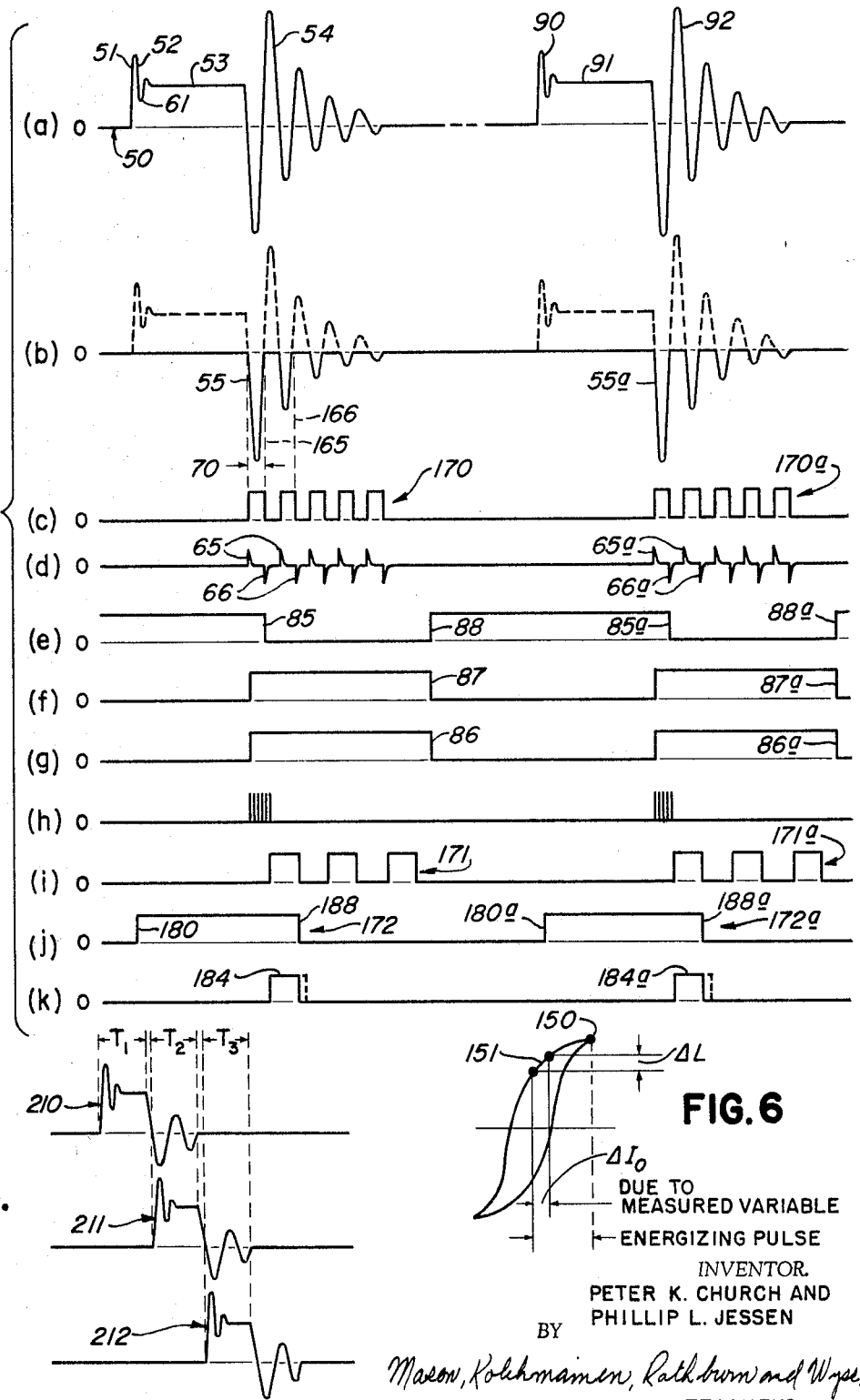

United States Patent Office
3,281,808
Patented Oct. 25, 1966

3,281,808
DATA MEASURING AND TRANSMISSION SYSTEM
Peter K. Church, Cascade, and Philip L. Jessen, Colorado Springs, Colo., assignors to Consolidated Controls Corporation, Bethel, Conn., a corporation of New Mexico
Filed Apr. 27, 1962, Ser. No. 196,540
5 Claims. (Cl. 340—183)

The present invention relates to the field of data measuring and data handling systems, and, more particularly, to a system in which one or more variable quantities are converted to corresponding electrical signals by means of transducers and these electrical signals are transmitted to a common readout or control station at which the electrical signals are examined to provide data relative to the variable quantities being measured, which data is then processed and utilized as desired.

While many data measuring and data handling systems have been developed, these systems are generally of the type wherein the transducers which measure the desired physical quantities produce electrical output signals whose amplitude represents, or is an analog of, the measured variable. When a number of physical quantities are to be measured, a commutator or switching arrangement is usually employed so that the output signals from the various transducers are sequentially connected to the data handling equipment. Usually each transducer is supplied with its own source of power and provides a continuous output signal even though this output signal is transmitted to the data handling equipment for only a brief period of time, while the commutator is connected to that particular transducer. Furthermore, in such a system any variation in the amplitude of the transducer output signal due to environmental changes, power supply variations, noise and extraneous pickup voltages in the transmission system, cross-talk between transducer channels and drift due to instability or other variations in amplifying equipment employed for the low level transducer output signals, is erroneously interpreted as a variation of the physical quantity being measured and, hence, any one or more of these factors can introduce errors in the data measuring process. In addition, the commutator itself can introduce amplitude variations between channels, due to dirty contacts, intermittent contact due to vibration or bounce, and other factors which will also be reflected as errors in the output signal which is supplied to the data handling equipment. Also, if an electronic or solid state switching arrangement is employed, variations in the voltage drop across the switching device due to changes in saturation voltage and the like, will be reflected as errors in the output system.

In those prior art systems in which the transducer output signal has an amplitude which is an analog of the physical quantity being measured, it is also necessary in many instances to convert this analog voltage signal into a corresponding digital or numerical signal so that the data represented by the transducer output signal can be processed and handled in subsequent numerical data handling equipment. This necessarily involves an analog-to-digital converter device which usually employs a so-called comparator in which the transducer output signal is compared to a reference waveform which may be a sawtooth wave, or a step function wave, and an output derived when the amplitude of the reference waveform exactly equals that of the transducer output signal. Such a comparator is an expensive and complicated piece of equipment and it is difficult to provide such a comparator in which the sawtooth is satisfactorily linear or which is of uniform accuracy throughout the desired operating range of amplitudes.

In other prior art data measuring systems the value of the measured variable is translated into a continuous alternating current signal the frequency of which varies in accordance with variations in the measured variable. When one or more of these signals are sampled or measured an input phase error or quantizing error is inherently produced due to the fact that the alternating current signal is not properly phased with respect to the measuring interval. Also, in such alternating current systems the disadvantages of separate power supplies, switching transients and the like are present where a number of quantities are to be measured.

It is, therefore, a primary object of the present invention to provide a data measuring and transmission system which avoids one or more of the disadvantages of the prior art systems described above.

It is another object of the present invention to provide a new and improved data measuring and transmission system in which an increase in the overall system accuracy and stability is achieved while employing simplified circuitry and lower system cost.

It is a further object of the present invention to provide a new and improved data measuring and transmission system which because of its decreased size and weight is particularly suitable for airborne applications.

It is a still further object of the present invention to provide a new and improved data measuring system wherein measurement accuracy is substantially unaffected by signal amplitude variations.

Another object of the present invention resides in the provision of a new and improved data measuring and transmission system in which transmission and amplification problems such as noise, pickup, cross-talk and drift are substantially eliminated.

A further object of the present invention resides in the provision of a new and improved data measuring system having high overall system accuracy, resolution and repeatability.

A still further object of the present invention resides in the provision of a new and improved data measuring system wherein a number of transducers are employed to measure a plurality of variable quantities while employing only a single power supply to energize the transducers sequentially.

It is another object of the present invention to provide a new and improved multichannel data measuring system in which only one channel is powered and operating at a particular time so that interchannel cross-talk and cross-modulation is avoided.

A still further object of the present invention resides in the provision of a new and improved data measuring and transmission system wherein the transducers employed to measure various physical quantities may be placed at considerable distances from the readout equipment and connected thereto by a cable, the commutator, power supply and data reduction equipment being all located at a central point.

It is a still further object of the present invention to provide a new and improved digital transducer which is extremely simple, rugged and small and is arranged to be powered from a remote point and to provide an output signal which is an accurate measure of the instantaneous condition of the measured variable.

It is another object of the present invention to provide a new and improved data measuring system in which a variable frequency alternating current output signal is produced in predetermined timed relation to control or clock pulses so that the period of the alternating current signal may be measured without phase or quantizing error.

Briefly, in accordance with one phase of the invention, the data measuring system of the present invention employs one or more digital transducers which comprise a simple passive resonant circuit, the resonant frequency of which is varied in accordance with the physical quantity to be measured. For example, the inductive branch of a parallel resonant circuit may be varied in accordance with a physical quantity such as pressure so that the resonant period of the passive resonant circuit varies linearly with respect to pressure. These transducers are connected by means of transmission lines to a central location at which is provided a common power supply. A switching or commutator arrangement is employed to sequentially apply a potential to each transducer circuit with the result that a first damped oscillatory transient is produced when the voltage is applied to the transducer resonant circuit and a second damped oscillatory transient is produced when the voltage is removed from this resonant circuit. Either of these damped oscillatory transients may be employed as the output signal of the transducer and since these oscillatory transients die out within a few cycles of oscillation, all of the outputs of the transducers may be combined in a common output channel through a suitable decoupling network without interference therebetween, provided the transducers are sequentially energized at a sufficiently low rate to permit the oscillatory transient produced by the previous transmitter to die out completely before the next transducer is energized. Accordingly, the output signals from all of the transducers are combined without transmitting the output signals through the commutator switching arrangement itself. Furthermore, only a single power supply is required even though a large number of transducers are employed. This arrangement has the further advantage that there is substantially no power dissipation at the transducer itself, since power is applied to the transducer only for a very brief interval of a few cycles during which energy is stored in the passive resonant circuit. This means that the transducer will not produce any heat itself so as to interfere with temperature measurements or the like, nor will it require any provision for heat dissipation. At the central location, facilities are provided for very accurately measuring the oscillatory period of the damped oscillatory transient which comprises the output signal from each transducer so that an accurate measurement is provided either in the form of a width modulated pulse or in the form of a numerical quantity of pulses, which accurately represents the value of the measured variable at the time it was sampled by the commutator.

Since the oscillatory period of the damped oscillatory transient which is utilized as the output signal of each transducer is the parameter which contains the desired information, i.e., the parameter which varies with changes in the measured variable, it will be seen that problems normally encountered in transmitting and amplifying low level voltage signals are substantially eliminated so that noise, extraneous voltage pickup, cross-talk and amplifier drift are not troublesome. Also, since each transducer comprises only a simple resonant circuit, which can be made extremely rugged and of small size, and no separate power supply is required for each transducer, the overall system cost and complexity is substantially reduced. In addition, since the oscillatory transient is produced in timed relation to the voltage pulse applied to the resonant circuit, the phase of the oscillatory transient is fixed relative to the applied pulses and hence the resonant period of the transient may be very accurately measured without input phase or quantizing error.

The invention, both as to its organization and method of operation, together with further objects and advantages thereof, will best be understood by reference to the following specification taken in connection with the accompanying drawings, in which:

FIG. 1 is a block diagram of a data measuring and transmission system embodying the principles of the present invention;

FIGS. 2(a) to 2(d), inclusive, are schematic diagrams of various forms of transducer adapters which may be employed in the system of FIG. 1;

FIG. 3 is a schematic diagram of an alternative data measuring and transmission system;

FIGS. 4(a) to 4(k) are a series of timing diagrams showing the waveforms developed at certain points in the systems of FIGS. 1 and 5;

FIG. 5 is a circuit diagram of a further alternative data measuring and transmission system;

FIG. 6 is a graph employed to explain the operation of the transducers of FIGS. 1 and 2; and FIG. 7 is a series of timing diagrams showing further waveforms developed in the system of FIG. 5.

Referring now to the drawings, and more particularly to FIG. 1 thereof, the data measuring and transmission system of the present invention is therein illustrated as comprising a plurality of transducers, three of which are indicated as the transducers 10, 11 and 12. Each of the transducers comprise a passive resonant circuit, the resonant period of which is arranged to vary in accordance with variations in a measured variable quantity. Thus, referring to the transducer 10, there is provided in this transducer a passive resonant circuit indicated generally at 15 having an inductive element 16 and a capacitive element 17 which are connected in parallel to form a parallel resonant circuit. In the illustrated embodiment the inductive element 16 is indicated as the element which varies in accordance with variations in the measured variable, and the capacitive element 17 remains fixed. However, it will be understood that the capacitive element 17 may equally well be made the variable element of the resonant circuit and the inductive branch 16 held fixed. A resistor 18 is connected in series with the parallel resonant circuit 15 to the output terminals 19 and 20 of the transducer 10, as will be described in more detail hereinafter in connection with the inductance 16.

The transducers 10, 11 and 12 may be positioned at various remote locations and each of these transducers is connected by way of a two-wire transmission line to a central readout location. More particularly, the output terminal 19 of the transducer 10 is connected to the center conductor of a shielded cable 25 and the output terminal 20 of this transducer is connected to the grounded sheath of the cable 25. In a similar manner, the output terminals of the transducer 11 are connected to a coaxial transmission line 26 and the output of the transducer 12 is connected to a coaxial cable 27.

The coaxial cables 25, 26 and 27 extend to a readout station indicated generally at 35, at which station there is provided a D.C. power supply 36, one output terminal of which is connected to ground and the other output terminal 37 of which is connected to the movable arm 38 of a motor driven commutator or electronic switching device indicated generally at 40. The commutator device 40 is employed sequentially to connect the D.C. output voltage of the power supply 36 to the transducers 10, 11 and 12 by way of the transmission lines 25, 26 and 27, respectively. More particularly, when the arm 38 of the commutator 40 engages the fixed contact 41 thereof, the D.C. voltage developed by the power supply 36 is connected by way of the center conductor of the transmission line 25 to the passive resonant circuit 15 in the transducer 10 so that the condenser element 17 is charged and energy is stored in the resonant circuit 15. During this charging process a small damped oscillatory transient is produced across the resonant circuit 15. However, in the embodiment shown in FIG. 1, this oscillatory transient is not utilized as the usable signal from the transducer 10, although this oscillatory transient would, of course, appear on the center conductor of the coaxial cable 25. When the commutator arm 38 moves off of the contact 41 the voltage of the power supply 36 is removed from the center conductor of the cable 25 so that a second damped oscillatory transient is produced across the resonant circuit 15. In this connection it will be understood that an electronic or solid state pulse generator an matrix arrangement may be substituted for the power supply 36 and commutator 40 to supply voltage pulses sequentially to the transducers 10, 11 and 12, etc., for high speed measuring applications. Such pulse generators should preferably have a low internal impedance so that energy may be rapidly stored in the resonant circuit of the transducer, as will be readily understood by those skilled in the art. Each voltage pulse from such pulse generator is equivalent to the "on" time of the commutator 40 and a damped oscillatory transient is produced across the resonant circuit at the end of this pulse in the same manner as when the commutator arm moves off the contact 41 and removes voltage from the terminal 19.

In order to provide a more clear understanding of the signal which is developed at the output terminals 19 and 20 of the transducer 10, reference is now made to FIG. 4(a). Referring to this figure, before the commutator 40 applies any voltage to the transducer 10, the voltage between the terminal 19 and ground of this transducer is at the zero level indicated at 50 in FIG. 4(a) and as soon as this arm 38 engages the contact 41 a positive voltage 51 is impressed upon the resonant circuit 15 in series with the resistor 18. The resonant circuit 15 is shock excited by the potential rise 51 so that a damped oscillatory transient indicated at 52 is produced across the resonant circuit 15. However, as soon as this transient dies out the voltage assumes the steady state value 53, this value of voltage 53 corresponding to the voltage drop across the resistor 18. When the arm 38 leaves the contact 41 the voltage of the supply 36 is removed so that the resonant circuit 15 produces a second damped oscillatory transient indicated at 54. It will be noted that the intial half-cycle of the transient 54 is in the negative direction as indicated at 55 whereas the initial half-cycle of the first damped transient 52 is in the positive direction, as indicated by the wave front 51. The damped transient 54 dies out within a few cycles and thereafter no voltage is applied to the transducer 10 until the commutator arm 38 again engages the contact 41. It will thus be seen that power is applied to the transducer 10 only for the very brief interval between the wave front 51 and the start 55 of the transient 54 and at all other times the transducer 10 is deenergized. However, the inductive branch 16 of the resonant circuit 15 is continuously varied in accordance with the value of the measured variable. Accordingly, each time the resonant circuit 15 is energized in the manner described above, the oscillatory period or resonant period of both the damped transient 52 and the damped transient 54 will have a value corresponding to the value of the measured variable at the time the transducer is energized. The amplitude 53 of the pulse of voltage applied to the resonant circuit 15 is preferably sufficient to drive the inductance 16 to saturation. As a result, the frequency of the first oscillatory transient 52 is considerably higher than that of the second transient 54. The frequency of both of these transients varies with the measured variable and hence either one can be used as an output signal although in the described embodiment the resonant period of only the second transient 54 is measured to provide the desired digital output signal corresponding to the measured variable.

In order to derive a useful output signal from the waveform shown in FIG. 4(a), which appears on the center conductor of the cable 25, this center conductor is directly connected to the cathode of an isolation diode 60, the anode of which is connected to the input of a Schmidt trigger circuit 62. The diode 60 functions to block all portions of the waveform shown in FIG. 4(a) which are above the zero axis 50 so that the waveform shown in FIG. 4(b) is transmitted to the input of the Schmidt trigger circuit 62. It will be seen by a comparison of FIGS. 4(a) and 4(b) that the positive damped transient 52 has been completely eliminated since the amplitude of the negative half-cycle portions of the transient 52 are not of sufficient amplitude to reach the zero level 50. Such a condition is conveniently achieved by providing a sufficient drop across the resistor 18 so that the negative portions of the transient 52, such as the negative half-cycle 61, do not reach the base line or zero level 50. In addition, the resistor 18 provides the additional functions of limiting the current drawn through the inductance 16 from the power supply 36 and of providing a suitable impedance termination for the cable 25. As a second order effect, the resistor 18 also assists in damping the oscillatory transient 52 which is developed across the resonant circuit 15 when voltage is applied thereto although the value of internal impedance of the power supply 36, or the generator impedance in the case of a pulse generator excitation, is primarily responsible for the damping ratio, i.e., the damping of oscillatory transient 52 relative to the damping of oscillatory transient 54.

By reference to FIG. 4(b) it will be seen that only the negative half-cycle portions of the second damped oscillatory transient 54 are passed through the diode 60 and applied to the Schmidt trigger circuit 62. The Schmidt trigger circuit 62 may be set to trigger at any convenient voltage level and provides a square wave output corresponding in width to the triggering level which is chosen, as will be readily understood by those skilled in the art. Preferably, the triggering level is chosen very close to the zero voltage level 50 so that the square wave signal shown in FIG. 4(c) is produced. By placing the triggering level close to zero where the slope of the oscillatory wave is greatest the effects of changes in the triggering level due to extraneous factors is minimized. Comparing FIGS. 4(b) and 4(c) it will be seen that the negative half-cycle portions which are passed by the diode 60 are converted into a square wave signal. The square wave output of the Schmidt trigger circuit 62 is applied to a differentiating circuit 63 so that the differentiated waveform shown in FIG. 4(d) is produced. It will be seen that the positive pips 65 and the negative pips 66 of the waveform shown in FIG. 4(d) correspond very precisely to the zero crossover points of the positive and negative half-cycles of the damped transient 54. Accordingly, if the interval of one or more of the half-cycles of the damped transient 54 is accurately measured a very precise indication will be provided of the value of the measured variable since the resonant frequency of the resonant circuit 15 is carried in accordance with this variable.

Any suitable arrangement may be employed to provide an accurate measurement of the resonant period of the damped oscillatory transient 54. In the arrangement shown in FIG. 1 a circuit is provided for measuring the first negative half-cycle, i.e., the time duration indicated at 70 in FIG. 4(c). To this end the differentiated waveform shown in FIG. 4(d) is applied to a normally off flip-flop circuit 75 which responds only to positive input trigger pulses and this differentiated waveform is also supplied to a normally on flip-flop 76 which responds only to negative input trigger pulses. The differentiated waveform is also supplied to the input of a reset bistable flip-flop circuit 77, the circuit 77 responding to positive input trigger pulses by initiating a predetermined but variable time delay, as will be readily understood by those skilled in the art. The first positive pip of the differentiated waveform shown in FIG. 4(d) causes the flip-flop 75 to turn on as indicated by the waveform in FIG. 4(f). The output of the flip-flop 75 and the output of the flip-flop 76 are both applied to a three input AND gate 80, the third input of which comprises a series of high frequency pulses from a clock oscillator 81. Since the flip-flop 76 is normally on, as indicated by the waveform shown in FIG. 4(e), as soon as the flip-flop 75 is triggered on, a positive signal is applied to both inputs 82 and 83 of the AND gate 80 so that the clock oscillator pulses are produced on the output conductor 84, as shown by the waveform in FIG. 4(h). These oscillator pulses continue to be produced on the output conductor 84 until the first negative pip of the differentiated waveform shown in FIG. 4(d) turns off the normally on flip-flop 76, as shown at 85 in FIG. 4(e). When this occurs the input from the two leads 82 and 83 to the AND gate 80 are no longer both positive so that the gate 80 is closed and no further clock pulses are transmitted to the output conductor 84. It will thus be seen that a quantity of output pulses are produced on the output conductor 84 which are proportional in number to the duration of one-half cycle of the damped oscillatory transient 54. Since the resonant period of this transient is varied by means of the inductance 16 in accordance with variations in the measured variable, the number of pulses appeared on the output conductor 84 are a numerical representation of the value of the measured variable at the time the oscillatory transient 54 is produced.

After the flip-flop 75 has been triggered on and the flip-flop 76 has been triggered off, in the manner described above, these flip-flops must be reset before they can respond to a further input trigger. However, in order that only one-half cycle of a particular oscillatory transient is measured, the reset flip-flop 77 is provided with a sufficient time delay that the flip-flops 75 and 76 will not be reset until after the positive and negative pips 65 and 66 corresponding to the oscillatory transient 54 have been completed. Thus, as shown in FIG. 4(g) the reset flip-flop 77 is arranged to delay reset until the point indicated at 86 in FIG. 4(g). When the reset flip-flop resets at 86, appropriate reset signals are applied to the flip-flop 75 and the flip-flop 76 so that these flip-flops are returned to their initial conditions as indicated at 87 in FIG. 4(f) and at 88 in FIG. 4(e). With this arrangement, the number of pulses produced on the output conductor 84 is proportional only to one-half cycle of the resonant frequency of the particular transducer being sampled. However, it will be understood that other suitable time interval measuring arrangements may be employed. Also, an arrangement which measures an entire cycle of the damped oscillatory transient 54 may be employed, as will be described in more detail in connection with FIG. 5. In the alternative, an arrangement which measures several cycles of the damped oscillatory transient may be employed since such measurement will again be dependent upon the value of the measured variable in the same manner as the first half-cycle which is measured by the arrangement shown in FIG. 1.

The commutator arm 38 does not engage the next contact 42 of the commutator until a predetermined time interval after it has ceased to make contact with the previous contact 41 so that during this interval in which no voltage is applied from the power supply 36 to any of the transducers, the damped transient 54 may be produced and measured in the manner described above. However, as soon as the transient 54 has died out, the arm 38 engages the next contact 42 so that the potential of the power supply 36 is applied by way of the cable 26 to the transducer 11. The transducer 11 includes a resonant circuit similar to the resonant circuit 15 of the transducer 10 and the series resistor 18 so that when the supply potential is applied to the transducer 11, a first damped oscillatory transient 90 is produced and after the circuit has assumed a steady state value 91, the arm 38 leaves the contact 42 so that a damped oscillator transient 92 is produced. In this connection, it will be understood that the waveform 90, 91 and 92 is actually produced at the terminals of the transducer 11 and ahead of the blocking diode 95, although this waveform has been indicated in FIG. 4(a) along the same zero axis as the waveform produced across the terminals of the transducer 10. The waveform produced by the transducer 11 is coupled through the blocking diode 95 which functions to block all of the positive portions of the waveform produced by the transducer 11 in a manner similar to the clipping described above which is done by the diode 60. Accordingly, only the negative half-cycle portions of the second damped transient 92 are passed through the diode 95, as indicated in FIG. 4(b).

The outputs of all of the transducers are connected to the common input of the Schmidt trigger circuit 62 so that the resonant period of the first half-cycle of the damped transient 92 is measured in a manner similar to that described above in connection with the damped transient 54, those waveforms which correspond to the transducer 11 being identified by the letter a. As a result, a number of pulses are produced on the output conductor 84 (FIG. 4(h)) which are proportional to the resonant frequency of the passive resonant circuit of the transducer 11 and hence provide an indication of the value of the variable measured by this transducer. In an entirely similar manner the commutator arm 38 functions to establish contact to the contact 43 so that the transducer 12 is energized for a brief inerval with the result that another damped transient waveform is produced at the output terminals of the transducer 12 and is coupled by way of the cable 27 to a diode 96. This diode functions to remove all but the negative half-cycles of the second damped oscillatory transient produced by the transducer 12 and the resonant frequency of this oscillatory transient is measured in the same maaner by the time interval arrangement described in detail heretofore so that a number of pulses are produced on the output conductor 84 which are proportional to the value of the variable measured by the transducer 12.

In discussing the resonant circuit 15 of the digital transducers of the present invention, it has been assumed thus far, that the capacitor 17 comprises the capacitative branch of this resonant circuit. However, it should be noted that the cable 25 will have a certain amount of capacity between its center conductor and sheath and this capacity will affect the frequency of the resonant circuit 15. When a relatively long cable is used to one transducers and a relatively short cable to another, the resonant frequency at the zero end of the measuring scale of each transducer may be slightly different, even though identical transducers are employed. While such a condition does not affect the accuracy of any particular transducer measurement, it is desirable that the resonant frequency of all of the transducers be the same at the zero end of their measurement scales so that a common resonant period which is measured at the readout station will represent a zero transducer output for all transducers. To this end, a small variable capacitor is connected across each of the transmission cables at the readout station end thereof and these capacitors can be adjusted so that the zero output resonant frequency of each transducers is the same. More particularly, a variable condenser 100 is connected across the cable 25, a variable condenser 101 is connected across the cable 26 and a variable condenser 102 is connected across the cable 27. These capacitors can be adjusted to compensate for the difference in transmission line length and other capacity inequalities between the transducers circuits so that the same resonant period is provided at each transducer output when this transducer is measuring the zero end of its range of the measured variable. In this connection it will be understood that the transducer resonant frequency will have a certain finite value even at the zero end of the measurement scale of the measured variable. Thus, if the inductance 16 is measuring pressure, this inductance will have a certain inductance value at zero pressure and this inductance value will increase or decrease as the pressure increases to its maximum measured value. In many instances the range of variation of the resonant frequency of the transducer will be approximately 20% of its absolute frequency value. That is, assuming that the resonant circuit of the transducer has a resonant frequency of 5,000 cycles per second at the zero end of the measurement range, this resonant frequency will decrease to a value of 4,000 cycles per second at the upper end of the measurement range.

While the variable capacitors 100, 101 and 102 have been shown as located at the readout station end of the transmission lines 25, 26 and 27, it will be understood that similar variable capacitors may be employed across the input terminals of the respective transducers, such as the input terminals 19 and 20 of the transducers 10, or, in the alternative, variable capacitors may be provided directly across the capacitive element 17 of the transducer resonant circuit. In this connection, it will be understood that as used in this specification and the claims appended hereto, the term "resonant circuit" as applied to the transducers is intended to include all such arrangements even though the capacitive portion of the circuit may be partially distributed and partially lumped. Also, it should be noted that in some instances the variable inductance 16 may have sufficient distributed capacity to provide a resonant frequency in the desired operating range, although, of course, such a condition will not occur until a rather high frequency of resonance is employed.

In certain instances, it is desirable to provide an output measurement at the readout station 35 which is linearly related to the change in the variable being measured by the transducer. To achieve this condition, it is necessary that the resonant period of the transducer resonant circuit vary linearly with the measured variable. However, if the resonant period is varied linearly with the measured variable, the variation in the inductance 16 should not vary linearly but rather should vary as the square root of the measured variable. This is because the resonant period of the transducer resonant circuit is determined by the formula:

$$T_R = 2\pi\sqrt{LC} \quad (1)$$

where $T_R$ is the period of one cycle at resonance, L is the inductance of the variable coil 16 and C is the capacity of the capacitor 17 and associated circuit capacitances. From Equation 1 it will be seen that in order to obtain a linear output from the system, a linear change in the measured variable must produce an inductance change which varies as the square root. It will also be evident from Equation 1 that the same considerations hold true if the capacitive branch of the resonant circuit is made to vary in accordance with the measured variable, that is the change in capacitance should vary as the square root of the change in the measured variable to provide a linear relationship between the transducer resonant frequency and the input measured variable.

In connection with the measurement of pressure, it has been found that the variable inductance element of the transducer may very conveniently comprise a flat, stiff diaphragm as the pressure sensitive element, this diaphragm being deflected in a non-linear manner towards an E-core and coil arrangement as pressure is applied to the device. As the diaphragm is deflected in this non-linear manner in accordance with pressure changes, a variation in the inductance of the coil or coils which surround the legs of the E-core is produced. A variable inductance of this general physical configuration is shown, for example, in U.S. Letters Patent No. 2,884,608 to Phillip L. Jessen, issued April 28, 1959. A transducer of this type, as described in the above identified patent, is extremely rugged and shock resistant since there are no linkages, cams, pivots, etc., the only moving part in the transducer being the diaphragm which travels only a few thousandths of an inch over the entire pressure measurement range. In one suitable resonant circuit arrangement, it was found that such a variable inductance having an inductance value of 22 millihenries, when placed in parallel with a suitable capacitor and the combination in series with a resistance 18 have a value of 50 ohms provided a satisfactory transducer arrangement in which the transducer resonant frequency was in the order of 5,000 cycles per second and the first damped transient 52 (FIG. 4(a)) was offset with respect to the zero axis by an amount sufficient to prevent it from being transmitted through the blocking diode, such as the diode 60 when a voltage of approximately 15 volts was supplied from the power supply 36. However, it will be understood that the resonant frequency of the digital transducer of the present invention may be chosen to have any value within a relatively wide range of values insofar as the present invention is concerned. Thus, resonant frequencies from 40 cycles per second to 70,000 cycles have been employed and this range could be extended considerably provided suitable pulse measuring techniques are employed. In this connection it will be understood that at higher frequencies it may be desirable to provide air core variable inductances or variable capacitances for the transducer variable elements. Temperature compensation of a diaphragm type variable inductance arrangement such as described in the above identified patent may be conveniently accomplished by selecting proper coefficient materials from a permeability, expansion and spring rate standpoint, as will be readily understood by those skilled in the art. If small temperature variations occur in the desired temperature operating range of the equipment, these may be compensated by means of appropriate positive or negative temperature coefficient capacitors which may be positioned within the housing of the transducer 10 and connected across the capacitor 17 or otherwise connected in circuit with the resonant circuit so that they provide temperature compensation for the resonant frequency thereof over the operating range of the equipment. In the alternative, a temperature sensitive resistor may be placed in series with either the inductance or capacitance leg of the resonant circuit which has an appropriate temperature coefficient to provide temperature compensation, as will be readily understood by those skilled in the art.

In order to offset the first damped transient 52 (FIG. 4(a)) with respect to the zero axis 50, it is necessary that the output voltage of the power supply 36 have a sufficient amplitude to produce the required voltage across the series resistor 18. When the energizing pulse is relatively wide the amplitude of the voltage of the power supply 36 is preferably made sufficiently large that the inductance 16 is driven to the saturation region each time voltage is applied thereto through the commutator 40. When the core of the inductance 16 is thus driven to saturation by each energizing pulse from the power supply 36, the core is returned to the operating point over the same hysteresis loop thereby virtually eliminating any magnetic hysteresis effects as well as long-term core drifts. It should also be noted that the width of the energizing pulse i.e., the time during which the commutator arm 38 remains on the commutator contact, such as the contact 41, and applies the D.C. voltage of the power supply 36 to the transducer, may under certain inductance designs have an effect on the resonant frequency of the transducer. This is believed to be due to the fact that when the core is driven to saturation during the charging period the inductance of the variable inductance branch 16 is affected during the period when the second damped oscillatory transient 54 (FIG. 4(a)) is produced. However, it has been found in the above exemplary situation in which a variable inductance of 22 millihenries is employed, that if the duration of the energizing pulse, i.e., the time the commutator arm 38 remains on the contact 41 is longer than one millisecond, no appreciable change in resonant frequency is experienced with further increase in the energizing pulse width.

It has also been found that when the energizing pulse is of extremely short duration, in the order of 5 to 6 microseconds, the resonant frequency is substantially unaffected by changes in the energizing pulse width.

However, with narrow pulse excitation it is believed that the capacitive branch of the resonant circuit is charged rather than driving the inductive branch to saturation. Such narrow pulse excitation is particularly useful in high speed applications where solid state circuitry is employed. In this connection it will be understood that the commutator arrangement 40 is essentially a low speed switching arrangement and while it is entirely satisfactory for low frequency applications, any suitable type of electronic pulse generator may be employed sequentially to energize the transducer resonant circuits. Such an electronic pulse generator, which may employ either vacuum tubes or transistors as desired, may be provided to sequentially apply a pulse of voltage of the desired amplitude and duration sequentially to the various transducers of the system in the same manner as the voltage distribution afforded by the commutator 40, as will be readily understood by those skilled in the art. However, in the case of either the mechanical or solid state commutator arrangement it is important that the commutator has a "clean" open time so that the resonant circuit of the transducer is permitted to oscillate or ring without interference from extraneous signals.

In the event that it is desired to measure a particular variable quantity which does not lend itself readily to transformation into a variable inductance or a variable capacity, a transducer adapter arrangement may be employed, several embodiments of which are shown in FIGS. 2(a) to 2(d), inclusive, of the drawings. With such an adapter arrangement it is possible to provide the above described oscillatory transient output signal with practically every type of analog measuring device available today. For example, if the output of a conventional thermistor, i.e., a temperature sensitive resistor, is to be measured, the arrangement shown in FIG. 2(a) may be employed. Referring to this figure, the thermistor 120, which is shunted by a resistor 121, is connected across the secondary winding 122 of a coupling transformer 123. The primary winding 124 of the transformer 123 forms the inductive branch of the transducer resonant circuit, the capacitive branch of which is formed by the condenser 125 which is connected across the primary winding 124. A resistor 119, which is similar to the resistor 18 in FIG. 1, is employed for cable termination and to offset the initial voltage transient produced during charging, as described heretofore in connection with the resistor 18 of FIG. 1.

The transducer arrangement of FIG. 2(a) is arranged to be energized over the cable 126 in a manner similar to that described in detail heretofore in connection with the transducers of FIG. 1, such as the transducer 10. In the arrangement of FIG. 2(a) the resistance variation of the thermistor 120 with temperature or other variable quantity, acts as a variable load across the secondary winding 122 which is reflected into the primary winding 124 as a change in inductance of the primary winding 124. Accordingly, the resonant frequency of the resonant circuit formed by the primary winding 124 and the capacitor 125 varies with changes in resistance of the thermistor 120. It will, of course, be understood, that when an energizing pulse is applied over the cable 126 a first damped oscillatory transient similar to the transient 52 (FIG. 4(a)) is produced, and when the energizing pulse is removed a negative going damped oscillatory transient such as the transient 54 in FIG. 4(a) is also produced. The resonant period of the second damped oscillatory transient will vary in accordance with changes in resistance of the thermistor 120 so that a very accurate and precise measurement of temperature variation may be effected at the readout station 35 in the manner discussed in detail heretofore. It should be noted that the arrangement of FIG. 2(a) again requires no source of power at the transducer itself, power being supplied to this transducer only during the brief interval of the energizing pulse. Furthermore, since power is supplied to the transducer of FIG. 2(a) only for very brief intervals there is very little power dissipated in the transducer itself and virtually no localized heating which would interfere with the desired temperature measurement.

Referring to the arrangement in FIG. 2(b), a transducer adapter arrangement is shown therein whereby the output of a thermocouple 130 may be employed in the production of the above described damped oscillatory transient type of output signal. More particularly, the thermocouple 130 is connected to the secondary winding 122 of the coupling transformer 123, the primary winding 124 of which forms with the capacitor 125 the transducer resonant circuit. The current produced by the thermocouple 130 changes the permeability of the core material of the transformer 123 and hence provides a corresponding change in the inductance of the primary winding 124. As a result, the resonant period of the resonant circuit 124, 125 is varied in accordance with changes in the output of the thermocouple 130. The secondary winding 122 has preferably many times more turns than the primary winding 124 so that a large impedance step down ratio is provided from the winding 122 to the winding 124, as will be readily understood by those skilled in the art.

In the arrangement of FIG. 2(c) a strain gauge bridge arrangement is shown in which the variable resistance elements 135 and 136 may be varied in accordance with any desired variable quantity. A local source of voltage 137 is provided and as the bridge is unbalanced a current will flow in the secondary winding 122 so as to produce a change in the permeability of the core material of the transformer 123 and hence produce a corresponding change in the inductance of the primary winding 124. Accordingly, the resonant period of the primary winding resonant circuit is varied in accordance with the physical quantity which is being measured by the strain gauge elements.

In FIG. 2(d) there is shown an arrangement whereby the voltage or current output of any type of conventional analog measuring instrument may be adapted to provide the damped oscillatory transient type of output signal of the present invention. Referring to this figure, the output of a conventional measuring instrument, which may comprise either a D.C. voltage or direct current signal, is applied to the input terminals 140 and 141 so that a current flows in the secondary winding 122 of the transformer 123. This current which is proportional to the measured variable, will change the permeability of the core material of the transformer 123 so as to produce a change in the inductance of the primary winding 124 and hence a corresponding change in the transducer resonant circuit frequency. Obviously, the input applied to the terminals 140 and 141 may have to be adapted in magnitude or range to provide the desired change in inductance of the primary winding 124 so as to conform to the outputs of other transducers of the system, as will be readily understood by those skilled in the art.

In the transducer adapter arrangement of FIGS. 2(a) to 2(d), inclusive, a relatively wide energizing pulse preferably is applied over the cable 126 and is arranged to drive the core material of the transformer 123 to saturation, as described above in connection with the variable inductance 16 of the transducer 10. More particularly, as shown in FIG. 6 of the drawings, wherein the BH curve of a typical core material is shown, the energizing pulse is arranged to have an amplitude sufficient to drive the core to saturation at the point 150. However, the maximum change in current of the secondary winding 122 due to changes in the measured variable has the value $\Delta I_0$ so that a range of inductance values $\Delta L$ is produced. When the core material is thus driven to saturation at the point 150 the transformer is always operated on the portion 141 of the hysteresis loop so that all magnetic hysteresis effects are eliminated as well as the effects of long-term core drift.

Referring now to FIG. 5, there is shown a data measuring and transmission system wherein a somewhat higher speed arrangement is employed to measure the resonant periods of the transducer circuits and wherein energization of the transducer circuits is synchronized with a source of timing or clock pulses used for measurement purposes so that input phase errors and quantizing errors are eliminated. In the system of FIG. 5, similar reference characters have been given to the elements corresponding to those described in detail heretofore in connection with FIG. 1. In FIG. 5 the output of the Schmidt trigger circuit 62 is applied to a flip-flop circuit 160, one output of which is supplied to an AND gate 161 and the other output of which is supplied to a disabling gate 162. The measuring arrangement shown in FIG. 5 is arranged to measure the interval from the end of the first negative half-cycle of the damped transient 54, i.e., the time 165 in FIG. 4(b) to the next positively increasing zero crossover point of the damped transient, i.e., the time 166. In other words, the arrangement of the system of FIG. 5 is adapted to measure the first complete resonant period of the damped transient following the first negative half-cycle 55. Furthermore, facilities are provided for disabling each transducer channel after one and one-half cycles of the oscillatory transient have been produced so that the commutator may be switched to the next channel without waiting for the entire oscillatory transient to die out. Such an arrangement is necessary when higher commutator speeds are desired since otherwise the signal from the first transducer would be present on the common output channel when the signal from the second transducer is to be measured. To this end the commutator 40 of FIG. 1 is replaced by a multisection switch indicated generally at 163 which is driven by a motor 164. The first switch section of the switch 163 comprises a rotor 167 and a plurality of stator contacts 190, 191 and 192 one for each transducer. A pair of idle stator contacts 193 are provided to permit shorting of the channels, as will be described in more detail hereinafter, and a long stator clip 194 is provided which continuously connects the rotor 167 to the power supply 36 indicated as a battery in FIG. 5 for simplification. The second section of the switch 163 comprises a rotor 200, a plurality of stator contacts 201, 202 and 203 one for each transducer, a pair of idle stator contacts 204 and a long stator contact 205 which continuously connects the rotor 200 to ground. As the motor 164 rotates the shaft of the switch 163, a projection 167a on the rotor 167 successively connects the D.C. power supply 36 to the transducer circuits in series with a resistor 175 connected between the supply 36 and ground. Preferably the projection 167a is of a width almost equal to the spacing between the stator contacts 190, 191 and 192 so that as soon as voltage is removed from one transducer circuit it is immediately applied to the next transducer circuit and there is very little dead time between transducer energizing periods.

In order to disable each transducer circuit after the first one and one-half cycles of the oscillatory transient have been produced, the second switch section of the switch 163 is provided, the rotor 200 thereof being arranged to short circuit to ground all of the transducer circuits except the one which is being energized and the channel immediately preceding in which the oscillatory transient is being produced by provision of the notch 200a in the rotor 200. Thus, in the position shown in FIG. 5 the stator contact 190 is connected to the supply 36 so that the transducer 10 is energized and the stator contact 201 is ungrounded. When the switch 163 is rotated so that the rotor 167a contacts the stator contact 191 voltage is removed from transducer 10 and is applied to transducer 11. However, the stator contact 201 remains ungrounded so that an oscillatory transient is produced in the output of transducer 10 while at the same time the transducer 11 is being energized. When the switch 163 moves so that the rotor 167a contacts the stator contact 192 voltage is removed from transducer 11 and is applied to transducer 12. Now, however, the stator contact 201 is grounded and shorts the oscillatory transient at the output of transducer 10 so that when voltage is removed from transducer 11 and an oscillatory transient is produced at the output of this transducer there is no interfering transient from transducer 10.

The above described sequence of charging, ringing and damping is shown in FIG. 7 wherein the waveform 210 being produced at the output of transducer 10, the waveform 211 at the output of transducer 11 and the waveform 212 at the output of transducer 12. The time T-1 represents the time during which voltage is applied to the transducer 10 through stator contact 190, the time T2 represents the period when voltage is applied to transducer 11 through contact 191 and the time T3 represents the period when voltage is applied to the transducer 12. The brief periods between times T-1, T2 and T3 represent the switching times between stator contacts 190, 191 and 192. In this connection it will be understood that the pairs of idle contacts 193 and 204 are provided to permit shorting each channel after a predetermined portion of the oscillatory transient, as described above. The stator contacts could obviously be spaced uniformly around the switch rotors in accordance with the number of transducers being measured.

It will be evident from FIG. 7 that each of the energizing or charging periods, such as the charging period T-1, plus the switching offtime between charging periods should equal one and one-half cycles of the lowest frequency oscillatory transient produced by any of the transducers being measured since otherwise the oscillatory transient on the second channel will start before one and one-half cycles are completed on the first channel and both signals will appear in the common input to the trigger circuit 62. In this connection it is pointed out that the rotor 200 is preferably arranged so that it shorts out the channel on which the ringing transient is being produced at the time voltage is removed from the next succeeding channel rather than shorting out this channel at the time voltage is applied to the second succeeding channel so that during the "off" switching periods between T-1, T2 and T3 oscillatory transients are not produced on two channels at the same time. Thus, the rotor 200 connects the stator contact 201 to ground at the time the rotor 167a leaves the contact 191 rather than at the time the rotor 167a engages the contact 192. On the other hand, the charging periods T-1, T2 and T3 may be of longer duration than one and one-half cycles of the lowest frequency oscillatory transient and the measuring circuit of FIG. 5 will function to select and measure only the time interval 165-166 (FIG. 4(b)) and will not respond to succeeding cycles of the damped oscillatory transient. More particularly, the flip-flop circuit 160 functions to divide the output of the Schmidt trigger circuit 62 so that the pulse wave train 170 (FIG. 4(c)) which comprises the output of the Schmidt trigger circuit, is reduced by a scale of 2 to the waveform 171 shown in FIG. 4(i). In this connection it will be understood that the waveforms 170 and 171 are illustrative of the condition wherein the entire damped oscillatory transient is supplied to the trigger circuit 62 and not the condition wherein only the first one and one-half cycles of each transient are supplied to the circuit 62 as described immediately above. However, since the circuit of FIG. 5 will function to select only the interval 165-166 irrespective of the succeeding portions of the damped transient, the condition of FIGS. 4(c) and 4(i), wherein relatively long, widely spaced charging pulses are employed, will be used to explain the operation of FIG. 5.

The waveform 171 is applied as one input to the AND gate 161 and another input to the AND gate 161 comprises the output of the disabling gate 162, this output being shown as the waveform 172 in FIG. 4(*j*). In order to provide a signal indicating the time at which an energizing voltage is supplied to each of the transducers sequentially, a small resistor 175 is placed in series with the ground terminal of the power supply 36 so that a small amplitude positive pulse is produced across the resistor 175 for the time period during which voltage is applied to each of the transducers 10, 11, 12, etc. This positive pulse produced across the resistor 175 is differentiated in a circuit comprising the condenser 176 and the resistor 177 so that a small positive spike of voltage is produced on the conductor 178 coincident with the application of voltage to each transducer. This positive spike is applied to the input of the disabling gate 162 and functions to turn this gate on as indicated at 180 in FIG. 4(*j*). Accordingly, the disabling gate supplies an enabling pulse to the AND gate 161 during the period when the first positive pulse occurs in the output of the flip-flop 160 coincident with the start of the waveform 171 (FIG. 4(*i*)), so that there is formed on the output conductor 182 of the AND gate 161 the positive pulse 184 shown in FIG. 4(*k*). However, coincident with the trailing edge of the first pulse of the wave train 171, a signal is applied over the conductor 186 from the flip-flop circuit 160 to the disabling gate 162 so as to turn this gate off as indicated by the trailing edge 188 of the waveform 172 in FIG. 4(*j*). Accordingly, the disabling gate 162 thereafter does not apply a positive enabling output to the AND gate 161 and hence no further pulses of the wave train 171 are supplied to the output conductor 182. There is thus produced on the output conductor 182 the single pulse 184 which has a width precisely equal to the resonant period of the particular transducer being sampled at that time. As discussed heretofore, the width of the pulse 184 will vary in accordance with variations in the measured variable, as indicated by dotted lines in FIG. 4(*k*).

The variable width output pulse 184 may be supplied to any suitable pulse width measuring equipment so as to provide an accurate and precise measurement of the width thereof. In FIG. 5, an arrangement is shown whereby the output pulse 184 may be converted to a wavetrain of high frequency pulses which are produced in synchronous or timed relation thereto so that these high frequency pulses may be counted without phase or quantizing errors. More particularly, a switch indicated generally at 220 in FIG. 5 is provided having a rotor 221 which is arranged to be driven by the motor 164 and has a group of equally spaced stator contacts corresponding to each of the stator contacts 190, 191 and 192 of the switch 163. Thus, in FIG. 5 a group of five stator contacts 225, 226, 227, 228 and 229 are successively engaged by the rotor projection 220*a* during the period when the voltage is applied to the transducer 10. All of the stator contacts are connected together and the rotor 220 is continuously connected through a battery 230 to ground so that a series of pulses are produced on the common output conductor 231 of the switch 220 at a frequency five times the rate of energization of the transducers. These pulses, after appropriate sharpening if needed, may then be used as clock pulses in a manner similar to the clock pulses from the oscillator 81 of FIG. 1 but with the important advantage that the pulses on the conductor 231 are locked in phase with the output pulse 184 (FIG. 4(*k*)) since they are produced in timed relation to the oscillatory transients produced by each transducer and from which the output pulse 184 is derived.

Accordingly, the high frequency pulses on the conductor 231 may be supplied to another input of the AND gate 161, as indicated in dotted lines in FIG. 5 so that pulses will be passed by the gate 161 which are proportional in number to the width of the output pulse 184. These pulses passed by the gate 161 may then be counted by any suitable pulse counting arrangement to provide a digital output signal corresponding to the value of the measured variable at each transducer. In this connection, it will be understood that the pulse counting arrangement employed to count the pulse output of the system of either FIG. 1 or FIG. 5 must be synchronized with the sequence of scanning of the group of transducers so that successive digital readings in each scanning cycle of the commutator correspond to the same transducer, as will be readily understood by those skilled in the art. It will also be understood that the timing pulses produced on the conductor 231 of FIG. 5 are preferably of a frequency many times greater than the frequency at which the transducers are charged, the above described arrangement wherein the timing pulses are five times greater in frequency being shown merely for purposes of illustration.

The mechanical switching arrangement of FIG. 5, while providing the above described advantage of closely spacing the transducer charging periods, is, nevertheless, inherently a slow speed arrangement. In the event a high speed system is required wherein a large number of transducers may be measured at a relatively high sampling rate, the arrangement shown in FIG. 3 may be employed. In FIG. 3 an electronic pulse generator arrangement is employed in conjunction with a high frequency clock oscillator. More particularly, a high frequency clock oscillator 250 supplies pulses to a frequency divider 251 wherein the pulse rate is reduced to a value satisfactory for controlling the scanning of the transducers electronically. The output of the frequency divider 251 is supplied to a ring counter and pulser 252 having a number of output channels 253, 254 and 255 corresponding to the number of transducers to be sampled. The circuit 252 is arranged to produce a voltage pulse successively on the output conductors 253, 254 and 255 under the control of pulses from the frequency divider 251 and may employ a ring counter binary counting chain or any other suitable vacuum tube or solid state switching arrangement for producing the pulses. Preferably, the pulsing circuits which supply a voltage pulse to each output conductor are of low internal impedance so as to charge the transducer resonant circuits rapidly and thereby permit increased speed of operation. Also, the use of a pulse generator of low internal impedance tends to damp the initial oscillatory transient 52 (FIG. 4(*a*)) so that the ratio of the desired oscillatory transient 54 (FIG. 4(*a*)) to the undesired transient 52 is increased. This ratio is also increased by using a measuring circuit, such as the zero crossover detector circuit 62, having high internal impedance so that the load on the transducer resonant circuit which is ringing is minimized. In FIG. 3 system components similar to those of FIG. 5 have been given the same reference numerals and the outputs of the diodes 60, 95 and 96 are supplied to the trigger circuit 62 of FIG. 5 so that the output pulse 184 (FIG. 4(*h*)) may be derived for each transducer, as described in detail heretofore. The clock pulses from the oscillator 250 are also supplied to the AND gate 161 in place of the timing pulses on the conductor 231 of FIG. 5 so that a large number of closely spaced pulses are produced in the output conductor 180 of the AND gate 161 corresponding to each output pulse 184. These pulses on the conductor 182 may then be measured in the manner described heretofore to provide a very accurate measurement of transducer resonant period without phase or quantizing error.

In the arrangement of FIGS. 3 and 5, the first full cycle of the oscillatory transient after the first negative half-cycle, i.e., the interval 165–166 (FIG. 4(*b*)) is measured. However, it will be understood that the triggering arrangement of FIG. 1, wherein only the first the first negative half-cycle of the resonant period is measured, may also be used in the synchronous measuring arrangement of FIGS. 3 and 5. Thus, by measuring only the first half-cycle of the oscillatory transient it will be evident from FIG. 7 that the transducer charging periods T-1, T2 and T3 can be correspondingly shortened since the oscillatory transient can be shorted out somewhat sooner. As a result, the switching or scanning speed of the system may be increased with such an arrangement while retaining the above discussed advantages of the systems of FIGS. 3 and 5.

While the invention has been described in connection with particular embodiments of the invention, it will be understood that various modifications may be made thereon which are within the true spirit and scope of the invention as defined in the appended claims.

What is claimed as new and desired to be secured by Letters Patent of United States is:

We claim:

1. In a multichannel data acquisition system, the combination of, a plurality of transducers, each of said transducers including a resonant circuit having inductive and capacitive elements, means for varying the reactance of one of said elements in a manner proportional to the square root of variations in a measured variable so that the oscillatory period of an oscillatory transient developed across said resonant circuit varies in a linear manner with respect to variations in said measured variable, means for energizing said transducer resonant circuits in predetermined order by applying a D.C. voltage thereto for a predetermined interval of time so as to store energy therein, whereby a damped oscillatory transient is produced across each of said transducer resonant circuits after said D.C. voltage is removed, means for deriving from each of said oscillatory transients in said predetermined order an output pulse having a width proportional to the period of the corresponding oscillatory transient, and means for combining said output pulses in a common output channel.

2. In a multichannel data acquisition system, the combination of, a plurality of transducers, each of said transducers including a resonant circuit the resonant frequency of which is varied in accordance with a measured variable, means for applying a potential of predetermined polarity to said transducer resonant circuits in predetermined order for a brief interval of time so as to store energy therein, whereby a damped oscillatory transient is produced across each of said transducer resonant circuits, a wave shaping circuit, means for supplying only that portion of each oscillatory transient which is of a polarity opposite to that of said applied potential to said wave shaping circuit in said predetermined order, and means controlled at least in part by the output of said wave shaping circuit for developing a single output pulse for each of said oscillatory transients, each of said output pulses having a width proportional to the period of the corresponding oscillatory transient.

3. In a multichannel data acquisition system, the combination of, a plurality of transducers, each of said transducers including a resonant circuit the resonant frequency of which is varied in accordance with a measured variable, means for applying a potential of predetermined polarity to said transducer resonant circuits in predetermined order for a brief interval of time so as to store energy therein, whereby a damped oscillatory transient is produced across each of said transducer resonant circuits, a wave shaping circuit, means for supplying only that portion of each oscillatory transient which is of a polarity opposite to that of said applied potential to said wave shaping circuit in said predetermined order, so as to produce in the output of said wave shaping circuit a series of pulse trains corresponding respectively to said portions of said oscillatory transients, means for dividing said pulse trains by a factor of two, and means for selecting only a single output pulse from each of said divided pulse trains.

4. In a multichannel measuring system, the combination of a plurality of transducers, each of said transducers including a resonant circuit the resonant frequency of which is varied in response to variations of a measured variable, a source of D.C. voltage, means for sequentially connecting said D.C. source across different ones of said resonant circuits, the periods during which said source is connected to said resonant circuits being separated by intervals of sufficient duration to permit the development of damped oscillatory transients across said resonant circuits during said separation intervals, a common output channel, means coupling all of said resonant circuits to said common output channel, and means connected to said common output channel for measuring the periods of said successively produced oscillatory transients to obtain a plurality of signals corresponding to the values of the measured variables.

5. In a multichannel measuring system, the combination of a plurality of transducers, each of said transducers including a resonant circuit the resonant frequency of which is varied in response to variations of a measured variable, a source of D.C. voltage, means for sequentially connecting said D.C. source across different ones of said resonant circuits, the periods during which said source is connected to said resonant circuits being separated by intervals of sufficient duration to permit the development of damped oscillatory transients across said resonant circuits during said separation intervals, a common output channel, means including a clipping device individual to each of said resonant circuits for coupling all of said resonant circuits to said common output channel, whereby only those portions of said oscillatory transients which are of a different polarity than said D.C. source are passed to said common output channel, and means connected to said common output channel for measuring said portions of successively produced oscillatory transients which are passed through said clipping devices to obtain a plurality of signals corresponding to the values of the measured variables.

References Cited by the Examiner

UNITED STATES PATENTS

| | | | |
|---|---|---|---|
| 2,274,557 | 2/1942 | Morgan et al. | |
| 2,418,375 | 4/1947 | Tourshou. | |
| 2,452,156 | 10/1948 | Schover | 340—195 |
| 2,462,061 | 2/1949 | Beatty. | |
| 2,495,780 | 1/1950 | Shepherd et al. | |
| 2,818,732 | 1/1958 | Bennett. | |

NEIL C. READ, *Primary Examiner.*

ROBERT H. ROSE, *Examiner.*

A. H. WARING, *Assistant Examiner.*